United States Patent [19]

Nussbaecher

[11] Patent Number: 4,639,888
[45] Date of Patent: Jan. 27, 1987

[54] CIRCUIT ARRANGEMENT FOR ACCELERATED CARRY FORMATION IN AN ADDER DEVICE

[75] Inventor: Hans K. Nussbaecher, Munich, Fed. Rep. of Germany

[73] Assignee: Siemens Aktiengesellschaft, Berlin and Munich, Fed. Rep. of Germany

[21] Appl. No.: 595,241

[22] Filed: Mar. 30, 1984

[30] Foreign Application Priority Data

Mar. 31, 1983 [DE] Fed. Rep. of Germany ....... 3311970
Dec. 21, 1983 [DE] Fed. Rep. of Germany ....... 3346241

[51] Int. Cl.[4] .............................................. G06F 7/50
[52] U.S. Cl. .................................................. 364/788
[58] Field of Search ....................................... 364/788

[56] References Cited

U.S. PATENT DOCUMENTS 3,100,835  8/1963  Bedrij ................... 364/788
3,316,393  4/1967  Ruthazer .............. 364/788
3,993,891 11/1976  Beck et al. ............ 364/788
4,525,797  6/1985  Holden ................. 364/788

OTHER PUBLICATIONS

Anderson, "Fire-Level Combinations Sum Predict & Carry Propagate Adder", *IBM Tech. Disclosure Bulletin*, vol. 14, No. 1, Jun. '71, pp. 112–113.
Unger, "Tree Realizations of Iterative Circuits", *IEEE Trans. on Computers*, vol. C-26, No. 4, Apr. 1977, pp. 365–383.
Sklansky, J., "Conditional-Sum Addition Logic", *IRE Transactions on Electronic Computers*, 1960, pp. 226–231.

*Primary Examiner*—David H. Malzahn
*Attorney, Agent, or Firm*—Hill, Van Santen, Steadman & Simpson

[57] ABSTRACT

A parallel combinational logic system has a shortened carry run for two binarily-coded numbers upon consideration of an input carry. In order to shorten the carry throughput time, two alternative carries are respectively formed, group-wise, from the sums of the operands in first combinational logic units, the actual result carries being selected therefrom and from a decision logic unit, upon consideration of other group carries. These result carries are supplied to second combinational logic units at whose inputs the operands to be combined are applied. Under the control of the result carries, the operands are combined group-wise with one another or, respectively, the final result is selected from two alternative intermediate results.

12 Claims, 21 Drawing Figures

FIG 2

FIG 3
| 1 |  | $C_{28}$ | $C_{24}$ | $C_{20}$ | $C_{16}$ | $C_{12}$ | $C_8$ | $C_4$ | $C_0$ |  |
|---|---|---|---|---|---|---|---|---|---|---|
| 2 | $C_{IN}=0$ | $c^0_{28}=1$ | 0 | 0 | 1 | 0 | 0 | 1 | 0 | 0 |
| 3 | $C_{IN}=1$ | $c^1_{28}=1$ | 0 | 0 | 1 | 0 | 1 | 1 | 1 |  |
| 4 | $C_{IN}=0$ | 1 | 0 | 0 | 1 | 0 | 0 | 1 | 0 | 1 |
| 5 | $C_{IN}=1$ | 1 | 0 | 0 | 1 | 0 | 1 |  |  |  |
| 6 | $C_{IN}=0$ | 1 | 0 | 0 | 1 | 0 | 1 | 1 | 0 | 2 |
| 7 | $C_{IN}=1$ | 1 | 0 | 0 | 1 |  |  |  |  |  |
| 8 | Result | 1 | 0 | 0 | 1 | 0 | 1 | 1 | 0 |  |
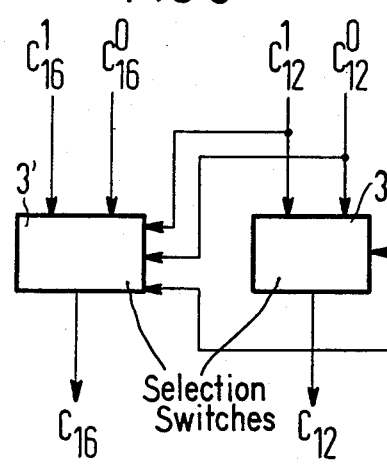
FIG 5
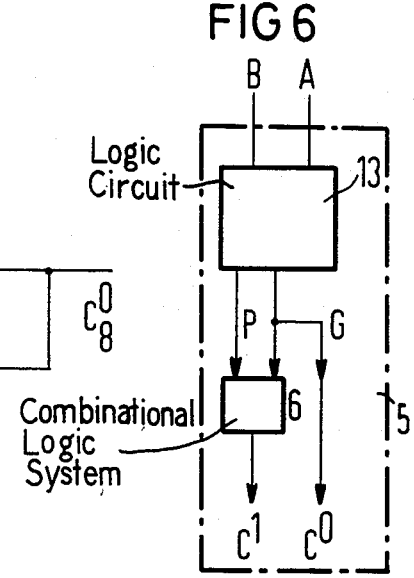
FIG 6

FIG 9a

| $C_{IN}$ | | | | | |
|---|---|---|---|---|---|
| $C_{IN}=0$ | $c^O_{1_{p_1}+p_2+\ldots+p_i+p_j}$ | $\ldots$ | $c^O_{1_{p_1}+p_2+\ldots+p_i+2}$ | $c^O_{1_{p_1}+p_2+\ldots+p_i+1}$ | $c^O_{1_{p_1}+\ldots+p_i-p_g}$ $\ldots$ |
| $C_{IN}=1$ | $c^1_{1_{p_1}+p_2+\ldots+p_i+p_j}$ | $\ldots$ | $c^1_{1_{p_1}+p_2+\ldots+p_i+2}$ | $c^1_{1_{p_1}+p_2+\ldots+p_i+1}$ | $c^1_{1_{p_1}+\ldots+p_i-p_g}$ $\ldots$ |
| $C_{IN}=0$ | $c^I_{1_{p_1}+p_2+\ldots+p_i+p_j}$ | $\ldots$ | $c^I_{1_{p_1}+p_2+\ldots+p_i+2}$ | $c^O_{1_{p_1}+p_2+\ldots+p_i+1}$ | $c^O_{1_{p_1}+\ldots+p_i-p_g}$ $\ldots$ |
| $C_{IN}=1$ | $c^{II}_{1_{p_1}+p_2+\ldots+p_i+p_j}$ | $\ldots$ | $c^{II}_{1_{p_1}+p_2+\ldots+p_i+2}$ | $c^1_{1_{p_1}+p_2+\ldots+p_i+1}$ | $c^1_{1_{p_1}+\ldots+p_i-p_g}$ $\ldots$ |
| $C_{IN}=0$ | $c^{III}_{1_{p_1}+p_2+\ldots+p_i+p_j}$ | $\ldots$ | $c^{III}_{1_{p_1}+p_2+\ldots+p_i+2}$ | $c^{III}_{1_{p_1}+p_2+\ldots+p_i+1}$ | $c^O_{1_{p_1}+\ldots+p_i-p_g}$ $\ldots$ |
| $C_{IN}=1$ | $c^{IV}_{1_{p_1}+p_2+\ldots+p_i+p_j}$ | $\ldots$ | $c^{IV}_{1_{p_1}+p_2+\ldots+p_i+2}$ | $c^{IV}_{1_{p_1}+p_2+\ldots+p_i+1}$ | $c^1_{1_{p_1}+\ldots+p_i-p_g}$ $\ldots$ |
| | $\ldots$ | | $\ldots$ | $\ldots$ | |
| $C_{IN}=0$ | $c^R_{1_{p_1}+p_2+\ldots+p_i+p_g}$ $\ldots$ | | $c^R_{1_{p_1}+p_2+\ldots+p_i+1}$ $\ldots$ | | $c^R_{1_{p_1}+\ldots+p_i-p_g}$ $\ldots$ |
| $C_{IN}=1$ | $c^S_{1_{p_1}+p_2+\ldots+p_i+p_j}$ $\ldots$ | | $c^S_{1_{p_1}+p_2+\ldots+p_i+1}$ $\ldots$ | | $c^S_{1_{p_1}+p_2+\ldots+p_i-p_g}$ $\ldots$ |
| | $c_{1_{p_1}+p_2+\ldots+p_i+p_j}$ $\ldots$ | | $c_{1_{p_1}+p_2+\ldots+p_2+1}$ | $\ldots$ | $c_{1_{p_1}+\ldots+p_i-p_g}$ |

FIG. 9c

| 9a | 9b |

| 0 | | 1 | | 2 | | ... | | |
|---|---|---|---|---|---|---|---|---|
| $c^0 l_1$ | $c^1 l_1$ | $c^0 l_1$ | $c^1 l_1$ | $c^0 l_1$ | $c^1 l_1$ | .... | | |
| $c^0 l_2$ | $c^1 l_2$ | $c^I l_2$ | $c^1 l_2$ | $c^I l_2$ | $c^{II} l_2$ | .... | $c^0 l_1$ | $c^1 l_1$ | $c_{l_1}$ |
| ... | ... | ... | ... | ... | ... | .... | | | |
| $c^0 l_{p_1}$ | $c^1 l_{p_1}$ | $c^I l_{p_1}$ | $c^1 l_{p_1}$ | $c^I l_{p_1}$ | $c^{II} l_{p_1}$ | .... | $c^0 l_2$ | $c^1 l_2$ | $c_{l_2}$ |
| $c^0 l_{p_1+1}$ | $c^1 l_{p_1+1}$ | $c^0 l_{p_1+1}$ | $c^1 l_{p_1+1}$ | $c^{III} l_{p_1+1}$ | $c^{IV} l_{p_1+1}$ | .... | $c^I l_{p_1}$ | $c^{II} l_{p_1}$ | $c_{l_{p_1}}$ |
| $c^0 l_{p_1+2}$ | $c^1 l_{p_1+2}$ | $c^I l_{p_1+2}$ | $c^1 l_{p_1+2}$ | $c^{III} l_{p_1+2}$ | $c^{IV} l_{p_1+2}$ | .... | $c^{III} l_{p_1+1}$ | $c^{IV} l_{p_1+1}$ | $c_{l_{p_1+1}}$ |
| ... | ... | ... | ... | ... | ... | .... | ... | ... | ... |
| $c^0 l_{p_1+p_2}$ | $c^1 l_{p_1+p_2}$ | $c^I l_{p_1+p_2}$ | $c^1 l_{p_1+p_2}$ | $c^{III} l_{p_1+p_2}$ | $c^{IV} l_{p_1+p_2}$ | .... | $c^{III} l_{p_1+p_2}$ | $c^{IV} l_{p_1+p_2}$ | $c_{l_{p_1+p_2}}$ |

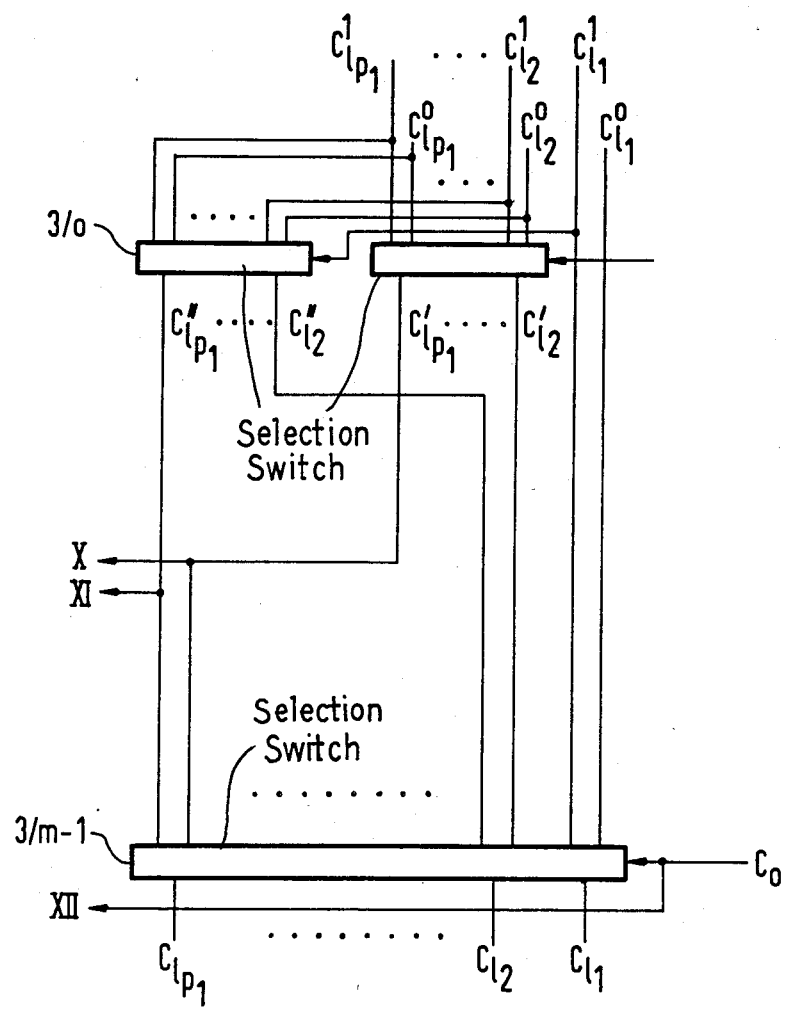

CIRCUIT ARRANGEMENT FOR ACCELERATED CARRY FORMATION IN AN ADDER DEVICE

BACKGROUND OF THE INVENTION

1. Field of the Invention

The present invention relates to a parallel combinational logic system having a shortened carry run for two binarily-coded operands upon consideration of an input carry, comprising adders and a decision logic connected in groups and time stages for determining conditional carries that are assigned to said groups.

2. Description of the Prior Art

The logic operation of two binary numbers can be reduced to the addition of two operands for all four basic arithmetic operations, as is well known in the art. Parallel processing is thereby preferred over serial processing when a high-operating speed is desired. Given the former calculating method, the bit sequences of the two operands are sub-divided into groups, for example digit-wise or byte-wise, and are simultaneously combined with one another in a correct digit position.

A complete simultaneity of the combination, however, is opposed by the processing of the carries which must, under given conditions, be carried from one group into the next. Their throughput time defines the processing time of a parallel adder.

A method for shortening the throughput time of the carries is disclosed in the article by J. Sklanski entitled "Conditional-Sum-Addition-Logic" published in IRE Transactions and Electronic Computers, June 1980, pp. 226–231. This addition mode is based on the calculation of "conditional" sums and carries. Alternative sums for individual groups of bit sequences are thereby identified in successive time intervals under the assumption that all possible carries occur. As soon as the actual value of an input carry for a group is determined, the results or, respectively, intermediate sums and intermediate carries already calculated for this carry, are selected in the next processing stage and further calculation is based thereon. Consequently, at least a part of the already-calculated bit sequences must thereby be adapted or, respectively, newly added up, in each of the processing stages. The circuit expense required for the implementation of this method expands to an ever-increasing degree with an increasing processing scope of the operands.

SUMMARY OF THE INVENTION

It is therefore the object of the present invention to provide a parallel combinational logic system of the above type which requires a lower circuit expense given a high processing speed.

The above object is achieved in that, ordered according to their significance, the bit sequences corresponding to the two operands are simultaneously supplied group-wise to a first logic element having two carry outputs at which, respectively, one of the two possible, alternative carries (carry pairs) is available. The carry outputs are supplied in pairs in second groups to the data inputs of first selection switches in the decision logic. The input carry is applied to the control inputs of the first selection switches of the least significant second group. All carry pairs of a group whose entering carry is known may be tapped via a selection switch controlled by this carry and at a result output assigned to this carry pair. The respectively least significant carry pairs of the second groups, with the exception of the second group already provided with resultant outputs, are connected in one of the time stages having more than one second group, being alternatively connected to the control inputs of the further selection switches disposed in pairs at whose data inputs the remaining carry pairs of this group are respectively available and at whose data outputs conditional, alternative carries can be tapped. The two most significant, alternative carries of the preceding time stage are connected in one of the following time stages to the control inputs of the selection switches (disposed in pairs) of the following second group at whose data input the alternative carries are available. The bit sequences corresponding to the two numbers are applied to the second logic elements assigned to the first groups and to whose control inputs the result outputs are respectively connected, offset by respectively one group in the direction of increasing significance.

With the assistance of the arrangement described above, the bit sequences to be combined are divided into groups and the carries are identified for each group without the bit sequences having to be repeatedly employed for arithmetic operations. The carries are determined by way of controllable selection switches from all possible alternatives and are then employed for the control of the combinational operation or, respectively, for the selection of two alternative sums. The decision logic for the determination of the carries can be constructed with simple, controllable selection switches. With an increasing plurality of time stages, groups can be combined and, therefore, the processing time can be shortened and the circuit expense can be further reduced.

Within the decision logic, the carries can be combined into groups of arbitrary word width, whereby all groups need not exhibit the same width. Further, the combinational logic system of the present invention has the great advantage that, given application of inverted input signals to the decision logic, only the inputs assigned to one carry pair need be interchanged in order to obtain negated result carries at the output of the decision logic. A time advantage in the determination of the carries can be achieved in that the selection switches of a plurality of time stages are interconnected with one another in the decision logic. Also possible, as a result of the group-wise format of the decision logic, is the determination of the carries in individual groups by way of other, known methods, i.e. the combinational logic system of the present invention is suitable for the combined application of different calculating methods.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a tabular illustration showing the combinational operation of two operands;

FIG. 3 is a tabular illustration showing the selection and formation of the carries in the decision logic of FIG. 1;

FIG. 5 illustrates a further development of a portion of the decision logic of FIG. 4;

FIG. 6 illustrates a combinational logic element;

FIGS. 9a and 9b, arranged in accordance with FIG. 9c, together form a tabular illustration of the combinational operation of two operands in general form;

FIGS. 10a, 10b and 10c, arranged as illustrated in FIG. 10d, together provide a general illustrative embodiment of the decision logic of FIG. 1;

DESCRIPTION OF THE PREFERRED EMBODIMENTS

Figure 1:
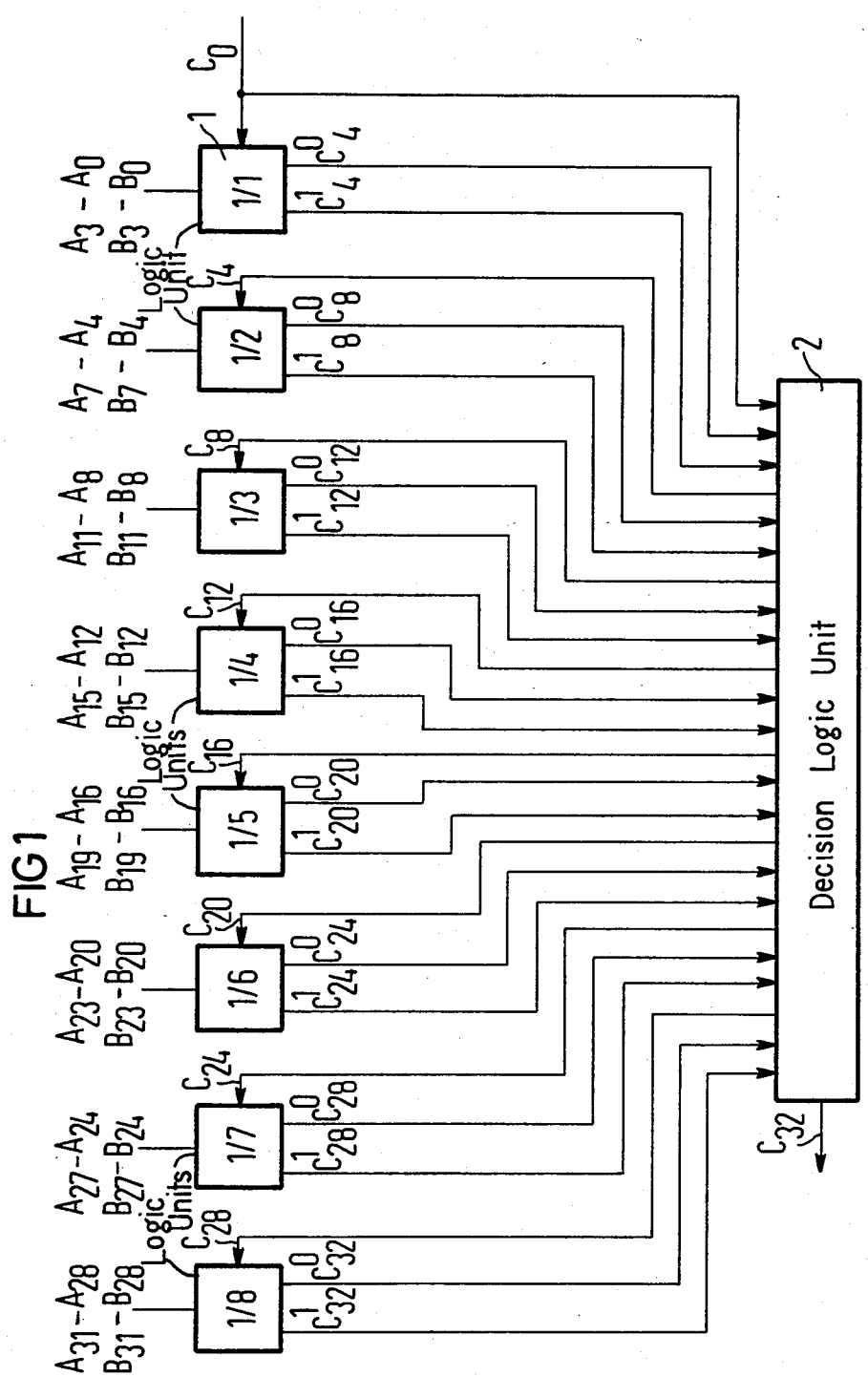
FIG. 1 is a block diagram of a parallel combinational logic system for two operands.

FIG. 1 illustrates eight parallel combinational logic units 1 (referenced 1/1-1/8) for the addition of two binarily-coded operands A and B for the derivation of two alternative carries $C_i^0$ and $C_i^1$, and a following decision logic unit 2 for the determination of the carries for the combinational logic units 1, the outputs of the carries being fed back to the combinational logic units 1. The two operands A and B are supplied digit-wise to the combinational logic units 1 as a bit sequence, whereby respective first groups of respectively four bits $A_0$-$A_3$, $B_0$-$B_3$, $A_4$-$A_7$, $B_4$-$B_7$ etc, are formed. Two alternative carries $C_i^0$ and $C_i^1$ are determined in each combinational logic unit 1 upon the application of two complementary input carries and are supplied to the decision logic unit 2. The sub-scripts i (i=4,8,12,16,20,28) identify the location within the bit sequence at which they appear. The super-scripts 0 or, respectively, 1 indicate that the corresponding carry was determined under the condition of an entering carry $C_{IN}$ having the value 0 or, respectively, the value 1. For example, the carries arising as the result of the addition of the first two groups $A_0$-$A_3$ and $B_0$-$B_3$ are referenced $C_4^0$ and $C_4^1$. From the two alternative results, the decision logic unit 2 selects the actual result upon consideration of all carries from the low-order groups, this then being supplied to the respectively following, higher-order group for the control of the addition or, respectively, for the selection of alternative sums. This is described in detail in FIGS. 7 and 8.

For example, the carry result $C_4$ of the lowest-order combinational logic unit 1/1 is fed to the control input of the next higher-order combinational logic unit 1/2. An input carry $C_0$ to be taken into consideration in the addition of the two operands A and B is fed both to the control input of the lowest-order unit 1/1 and to the decision logic unit 2. The highest-order carr $C_{32}$ identified in the illustrated decision logic unit 2, which appears at the $32^{nd}$ place of the bit sequence of the result of the logic operation can be forwarded by the decision logic unit to a further circuit of the type just described as an input carry.

The designation "group" is employed for a plurality of combined bits, as well as for the lines charged with the corresponding signal levels, together with the selection switches (multiplexer arrangements) and adders to which they lead. Each group can thereby comprise an arbitrary plurality of bits or, respectively, lines and modules.

Figure 2:
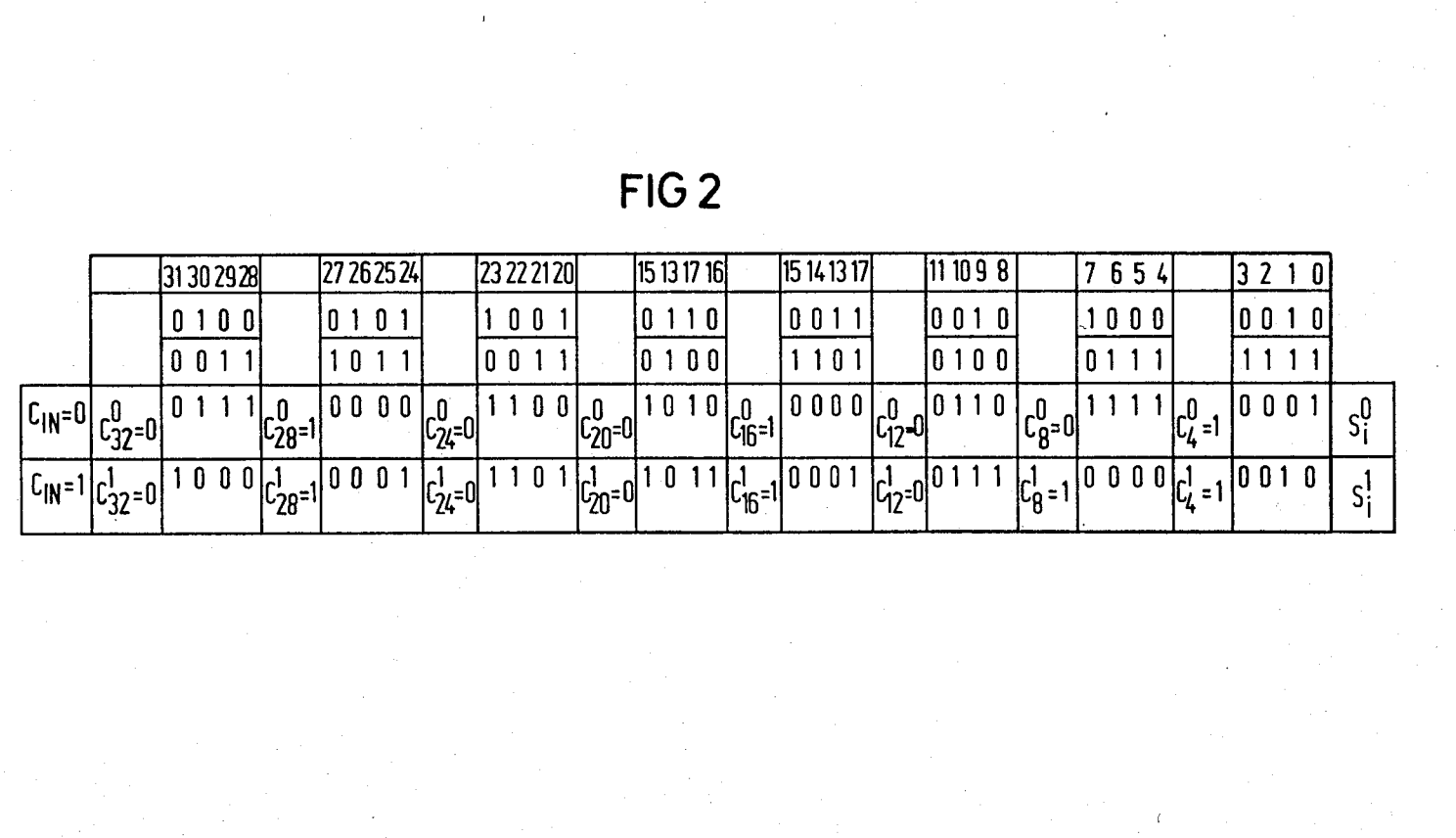

The operation of the combinational logic units 1 shall be explained below with reference to the tabular illustration of FIG. 2.

The two operands A and B respectively comprise a sequence of 32 bits which are sequentially numbered with increasing significance from i=0-31. The bit sequences here are sub-divided into eight first groups having four places. As has already been described in conjunction with FIG. 1, two respective alternative sums $S_i^0$ and $S_i^1$ are simultaneously formed for each first group, independently of the neighboring first groups, whereby the one sums $S_i^0$ are formed under the assumption of an entering carry having the value 0 and the other sums $S_i^1$ are formed under the assumption of an entering carry having the value 1, so that $C_{IN}=0$ is the assumption of the first case and $C_{IN}=1$ is the assumption in the second case. The carries arising in the individual groups are referenced $C_i^0$ given the entering carry $C_{IN}=0$ and are referenced $C_i^1$ given the entering carry $C_{IN}=1$, whereby i assumes the values 4,8,12,16,20,24,28,32 in this case.

In the lowest-order groups $A_0$-$A_3$ and $B_0$-$B_3$ shown in the right-hand column, the operand A exhibits, for example, the bit sequence 0010 and the operand B exhibits the bit sequence 1111. Given the assumption that the entering carry is 0, the sum consists of the bit sequence 0001 and the carry $C_4^0$ has the value 1. Given the assumption that the entering carry has the value 1, the sum comprises the bit sequence 0010 and the carry $C_4^1$, has the value 1 in this case.

Referring to FIG. 3, the operation of the decision logic unit 2 is described for a selection from the alternative carries and $C_i^0$ and $C_i^1$ to select the carry result $C_i$. The selection occurs in successive time intervals, the time stages 0, 1, 2 (right-hand margin column). In order to simplify the description, the rows of the table are sequentially numbered 1-8 (left-hand margin column). Row 1 contains the designation for the carries, beginning with the lowest-order entering carry $C_0$ up to the highest-order result carry $C_{28}$ which arises in the sum formation after the $28^{th}$ place of the bit sequence and which serves as the entering carry in the sum formation of the highest-order group ($A_{28}$-$A_{31}$ and $B_{28}$-$B_{31}$).

The alternative carries of the time stage 0 correspond to the carries that were determined by the first combinational logic unit 1 and which are supplied to the decision logic unit 2. In the illustrated example, it has been assumed in the time stage 0 that the entering carry $C_0$ entering into the lowest-order group or, respectively, applied to the lowest-order combinational logic unit 1/1 has the value 0, this being indicated by the entry of this value in row 2.

Two respective first groups disposed next to one another are combined into second groups in the time stage 1, so that the number of groups is reduced in four given a combination of two carries to form one group which has been assumed here for the sake of simplicity. A first selection of the pairs of carries offered as alternatives occurs in the time stage 1. Upon transfer from the time stage 0 to the time stage 1, a first selection of the alternative carries occurs such that the respectively lower-order carry of a group selects its possible successor, this being indicated by arrows. The input $C_0$ into the lowest-order group or, respectively, applied to the lowest-order unit 1, for which, based on the above assumption, there is no alternative, selects its successor $C_4^0 = 1$ from the two possible carries $C_4^0$ and $C_4^1$ because it has the value 0. These two carries are thus unequivocally defined as a result carries. They can therefore be transferred, unaltered, into the next time stages and/or fed to the output of the decision logic unit 2.

The selection of the possible successors in the combined groups $C_8$, $C_{12}$ and $C_{16}$, $C_{20}$ as well as $C_{24}$, $C_{28}$ cannot be absolutely undertaken upon transfer from the time stage 0 into the time stage 1, since the entering carry from the lowest-order group (i.e. the carry $C_4$) is not yet determined at this time. The selection, therefore, occurs such that the following carries are selected within the combined groups in accordance with the values of the lowest-order carries. Therefore, in accordance with their values 0; 1, 0, respectively, the carries $C_8^0$, $C_{16}^0$, $C_{24}^0$ in row 2 select the calculated successor 0,0,1 under the assumption of an entering carry 0 or 1, respectively. In row 3, these carries $C_8^1$, $C_{16}^1$, $C_{24}^1$ select their successor 0, 0, 1 in accordance with their values 1, 1, 0. In accordance with the broken-line arrows, these values are transferred group-wise into the time stage 1 (row 4 or, respectively, row 5).

In the time stage 1, the highest-order result carry (the carry $C_4$ in the illustrated example) selects the carries of the next higher-order group which consists of the carry pairs $C_8^0$, $C_8^1$ or respectively $C_{12}^0$, $C_{12}^1$. In accordance with its value 1, it selects the carries that were calculated (row 5) given the assumption of an entering carry having the value 1. The carries having the values 1 or, respectively, 0 are thus determined as further result carries $C_8$ and $C_{12}$. Simultaneously, the highest-order carries of each group in the time stage 1 select their possible successors in the next higher-order group. In accordance with their values 0, 0, the two carries $C_{20}^0$ and $C_{20}^1$ select the group consisting of the carry pairs $C_{24}^0$, $C_{24}^1$ and $C_{28}^0$, $C_{28}^1$ which were calculated under the assumption of an entering carry having the value 0 and which exhibit the values 0, 1 (row 4).

Upon transfer from the time stage 1 to the time stage 2, new groups are again formed from the results of the time stage 1. Those groups from which result carries have not yet been selected are thereby combined, i.e. those groups in which carries offered as alternatives are still contained. In the illustrated example, this applies to the carry pairs $C_{16}$, $C_{20}$, $C_{24}$, $C_{28}$, in accordance with their values for $C_{in}=0$ or respectively $C_{in}=1$. In the time stage 2, the highest-order result carry of a group selects its successor group-wise in accordance with its value. Consequently, the carry $C_{12}$ (in accordance with its value 0) selects all carries from $C_{16}$–$C_{28}$ which were calculated under the assumption of an entering carry having the value 0 (row 6). All result carries ($C_4$–$C_{28}$) are therefore determined in this example. The corresponding bit sequence 10010110 is set forth in row 8. Since the number of respective group members increases with the number of time stages, and since the selection of the carries occurs group-wise, the processing speed is directly dependent on the length of operands.

Figure 4:
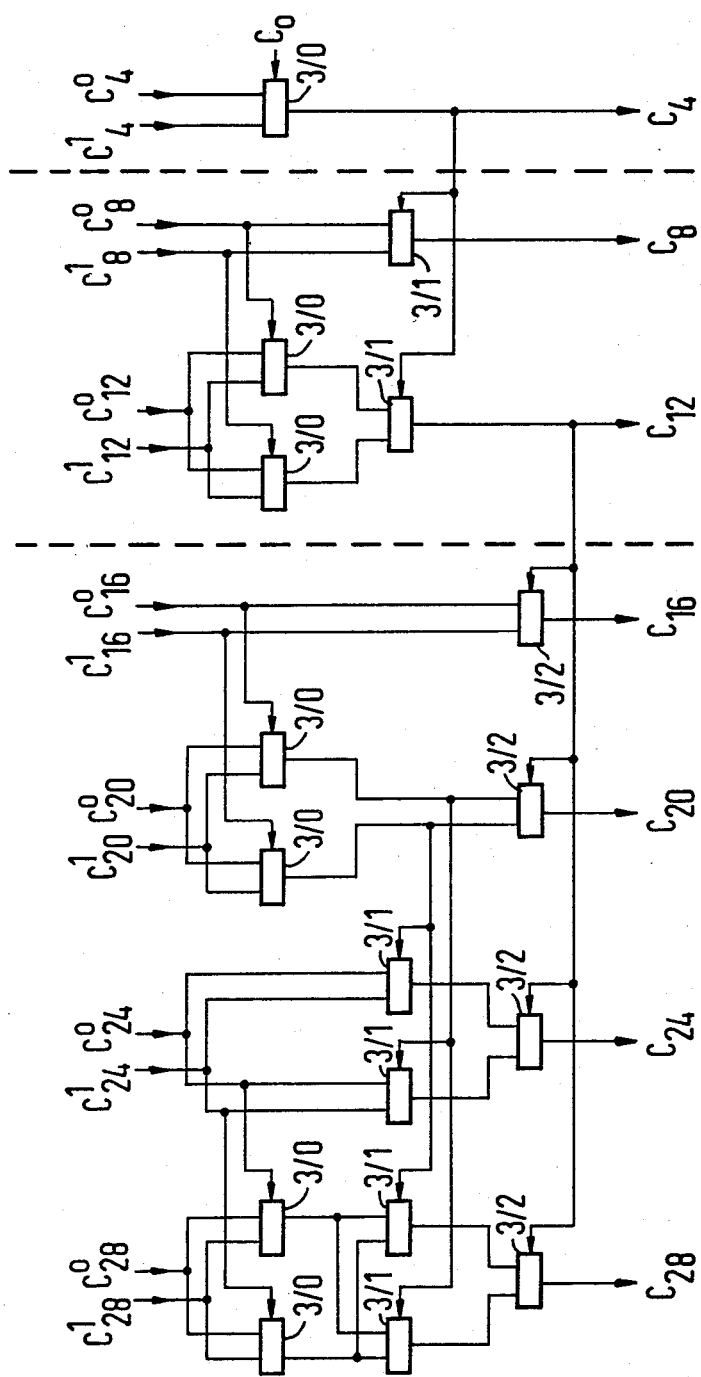
FIG. 4 is a schematic representation of an embodiment of the decision logic.

The decision logic unit in FIG. 4 exhibits seven pairs of input lines which are combined into second groups and charged with signal levels that represent the carries $C_4^0$, $C_4^1$, $C_8^0$, $C_8^1$ ... $C_{28}^0$, $C_{28}^1$. For example, the carry pair $C_4^0$ and $C_4^1$ is assigned to the lowest-order pair of lines and the signal level representing the carry $C_4$ may be tapped at the result output.

The decision logic unit is connected group-wise and stage-wise. The respective components of the decision logic unit that are actuated within a prescribed time interval are therefore assigned to one of the time stages 0, 1, 2. The groupings do not remain identical over all time stages; new groups can arise due to combination.

The lowest-order group in the time stage 0 encompasses a line pair with the carry pair $C_4^0$, $C_4^1$ which is fed via a line pair to the data inputs of the first selection switch 3/0. All further, higher-order groups encompass two carry pairs, whereby the higher order carry pairs are respectively fed in parallel to the data inputs of two selection switches 3/0. The lower-order carry pairs are alternatively transmitted to the control inputs of the selection switches 3/0 of their group, i.e. a respective carry selects a selection switch 3/0. The input carry $C_0$ selects the selection switch 3/0 of the lowest-order group. The selection switch 3/0 of the lowest-order group selects the result carry $C_4$ from the carry pair assigned thereto. The selection switches 3/0 of the further groups of the time stage 0 respectively select further carry pairs from the carry pairs assigned thereto, the further carry pairs again consisting of two alternative carries.

These carries, as well as the carries that are employed for selection, are supplied in new groupings to further selection switches 3/1 in the time stage 1.

In the time stage 1, the highest-order, unequivocally-identified result carry of a group is utilized for the drive of the selection switches 3/1 of the next higher-order group. Since only the result carry $C_4$ is known from the time stage 1, only the result carries $C_8$ and $C_{12}$ of the next group can be determined from the alternative carries. This occurs by way of the selection switches 3/1 to whose data inputs a respective alternative pair of carries is fed. In the next higher-order groups the highest-order alternative pair carries is respectively utilized for the drive of the selection switches 3/1 disposed in pairs in the, in turn, next higher group. In this manner, all carries occurring in pairs and, for example, the group having the input carries $C_{24}^0$, $C_{24}^1$ and $C_{28}^0$, $C_{28}^1$ are respectively supplied to parallel pairs of the selection switches 3/1 which are alternatively driven by the highest-order carry pair of the preceding group identified in the time stage 0.

The alternative carries appearing in pairs and determined therefrom are selected in the time stage 2 by way of selection switches 3/2. All carries still only appearing in pairs are combined in the time stage 2 to form a new group. The selection switches 3/2 of this group are driven by the highest-order result carry $C_{12}$ the preceding group. The result carries $C_{16}$, $C_{20}$, $C_{24}$ and $C_{28}$ are therefore simultaneously selected in the time stage 2.

FIG. 5 illustrates a modification of the circuitry of the selection switches in the decision logic according to FIG. 4, with which carries can be applied across a plurality of groups or stages. In the illustrated example, the carry pairs $C_{12}^1$, $C_{12}^0$ belongs to a lower-order group than the carry pair $C_{16}^1$, $C_{16}^0$. Both carry pairs are transmitted to the data inputs of the selection switches 3 and multiple selection switches 3', whereby the multiple selection switch 3' of the higher-order carry pair is driven both by the input carry $C_8^0$ and the lower-order carry pair $C_{12}^1$, $C_{12}^0$. The result carry $C_{16}$ can be calculated independently of the result carry $C_{12}$ in this manner. The time required for the calculation of the result carries $C_{12}$ can therefore be saved in the calculation of the result carry $C_{16}$. The selection switch 3' consists of an arrangement of a plurality of multiplexers.

FIG. 6 illustrates a detail 5 of the combinational logic unit 1 for the determination of the alternative carries in the combinational operation of two operands A, B which are applied in parallel at the data inputs. A value which arises from the "OR" operation of the operands A and B may be tapped at an output P of a logic circuit 13. A value arises from the "AND" operation of the two operands and is available at an output G. The operations respectively occur bit-wise. A carry $C^0$ arising from the combinational operation of the operands A, B, i.e. under the assumption of an input carry having the value 0, corresponds to the value applied to the output G. A carry $C^1$, i.e. under the assumption of an input carry having the value 1, is obtained by way of the "OR" operation of the output quantities P and G in a combinational logic circuit 6.

Figure 7:
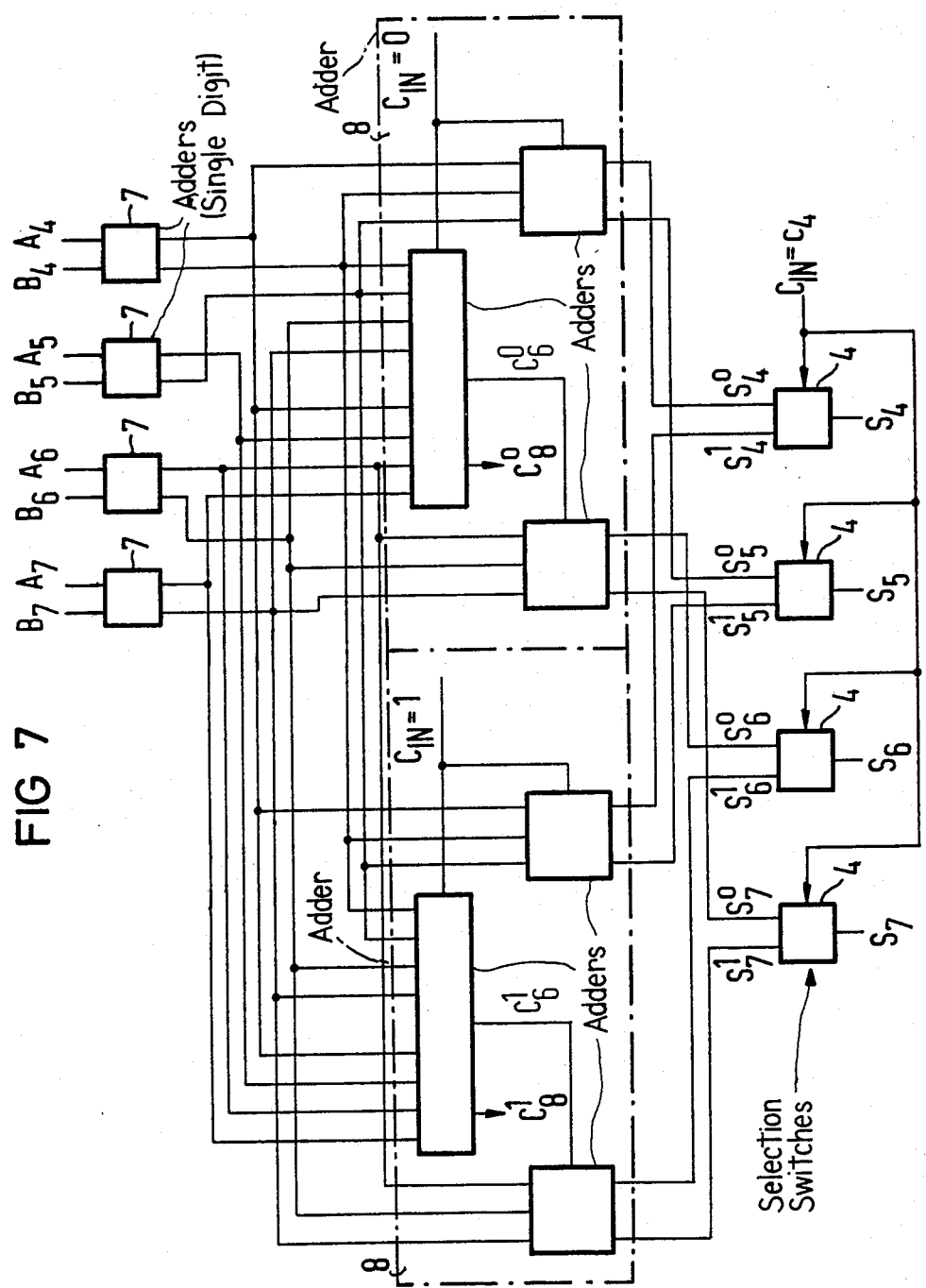
FIG. 7 is a schematic representation of an embodiment of an adder which may be utilized in the combinational logic system of FIG. 1.

Referring to FIG. 7, an example of a combinational logic unit 1 is illustrated as comprising two parallel adders 8. It serves for the addition of two operands A, B represented as bit sequences having, respectively, four bits, whereby the individual bits are referenced $A_4$, $B_4$, $A_5$, $B_5$, etc., and for generating two alternative, conditional carries $C_4^1$, $C_4^0$. The relationships employed by way of example correspond to those of the first group according to FIGS. 1–4. The bits of identical significance are respectively supplied to one-digit adders 7 whose sum outputs and carry outputs are supplied in parallel to the two adders 8. The two adders 8 function independently from one another, whereby both are charged with permanently-impressed, complementary entering carries $C_{IN}=0$, $C_{IN}=1$. Such adders are known as "simple ripple-carry adders". Each of these two adders 8 comprises four outputs for respectively one bit. The adder 8 having the entering carry with the value 0 generates a result bit sequence whose bits are referenced $S_4^0$, $S_5^0$, $S_6^0$, $S_7^0$. The adder having the entering carry with the value 1 generates an alternative sum bit sequence whose bits are referenced $S_4^1$, $S_5^1$, $S_6^1$, $S_7^1$. The two adders 8 also generate a respective carry that is referenced $C_8^0$ or, respectively, $C_8^1$.

The bits of identical significance in the two alternative bit sequences are supplied in pairs to the data inputs of selection switches 4 which select a result sum bit from each pair. The selection occurs by way of a drive at the control input by a carry $C_4$ that had been selected by the decision logic unit 2 from the two carries $C_4^0$ and $C_4^1$ of the lowest-order group calculated as alternatives. The bits of the select bit sequence are referenced $S_4$, $S_5$, $S_6$ and $S_7$. The bit sequence represents the result of the sum formation. The complete bit sequence of the sum of the operands A, B is obtained by connecting the result sum bits of all groups.

Figure 8:
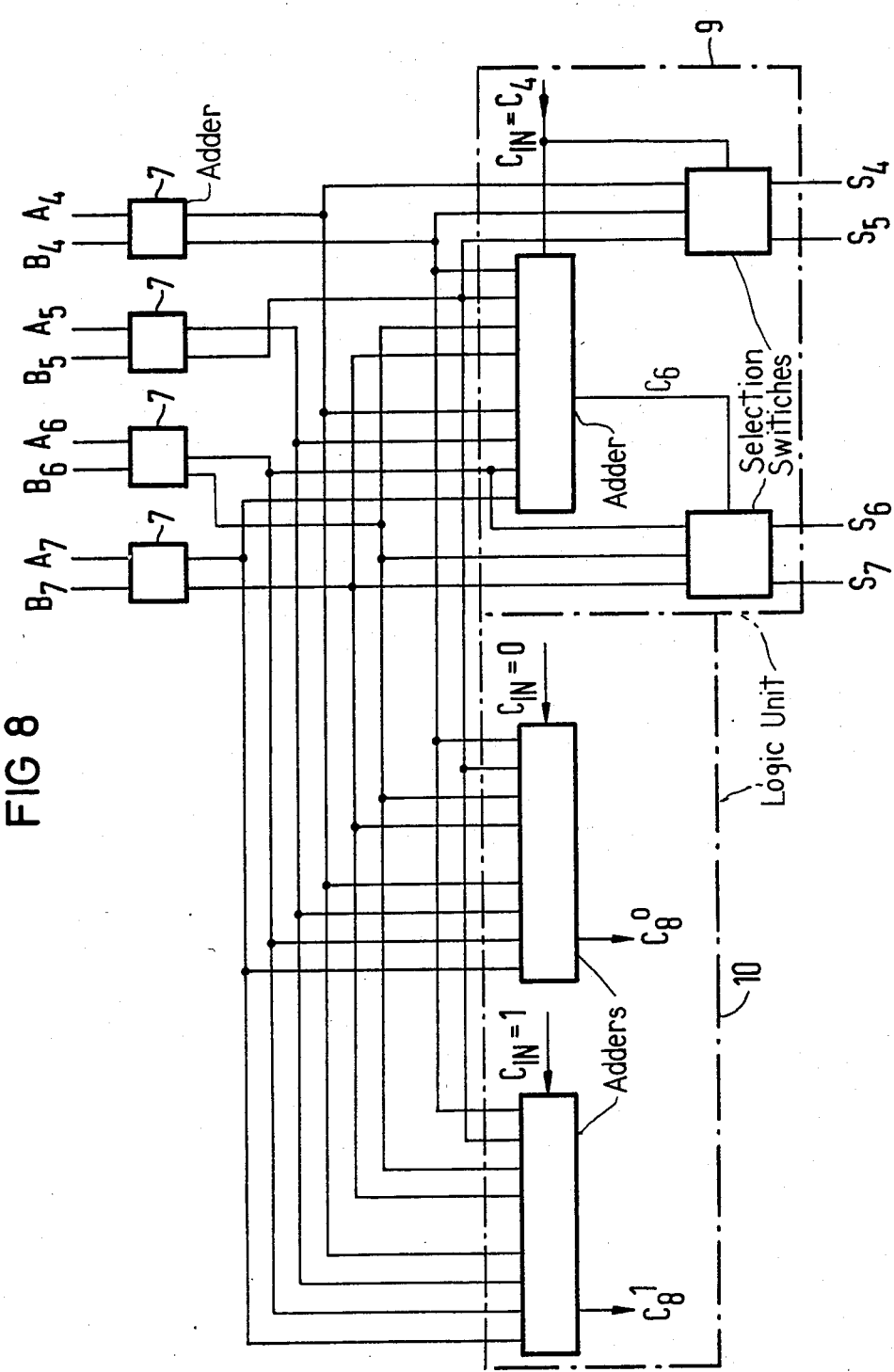
FIG. 8 is a schematic representation of an embodiment of an adder which may be utilized in the combinational logic system of FIG. 1.

FIG. 8 illustrates another example of the structure of the combinational logic unit 1 consisting of three adders 7, 9 and 10. In this example, the adder 9 forms a sum bit sequence $S_4$, $S_5$, $S_6$, $S_7$ from the two bit sequences $A_4$, $B_4$, $A_5$, $B_5$, etc., applied to the input upon consideration of an entering carry $C_{IN}$. In this case, the result carry $C_4$ formed by the decision logic unit 2 is supplied as the entering carry. The input at which the signal representing the entering carry is applied is generally referred to as the control input since it influences the formation of the result. Since the sum formation is executed in the adder 9, upon consideration of the result carry $C_4$ the result bit sequence already represents the final result.

In general, FIGS. 9a and 9b, taken together as indicated in FIG. 9c, provide a tabular illustration of the formation and selection of carries for an arbitrary number of first groups. The carries belonging to the first group are referenced with the subscripts $1_1$, $1_2-1_{p1+p2+\ldots+pi+pj}$. As in the table of FIG. 2, the super scripts 0 and 1 indicate whether the corresponding carry was determined under the assumption of an input carry having the value "0" or the value 1. The determination of the result carries extends from the stage 0 to the stage $m-1$, this being illustrated in the right-hand margin column of the figures. The alternative results are selected in the last stage $m-1$ dependent on the value of the input carry $C_0$. In the illustrated example, the input carry $C_0$ has the value 0, so that the corresponding carries are accepted as result carries, this being illustrated by broken-line arrow and the restitution in the last row of the table (FIGS. 9a and 9b).

Figure 10A:
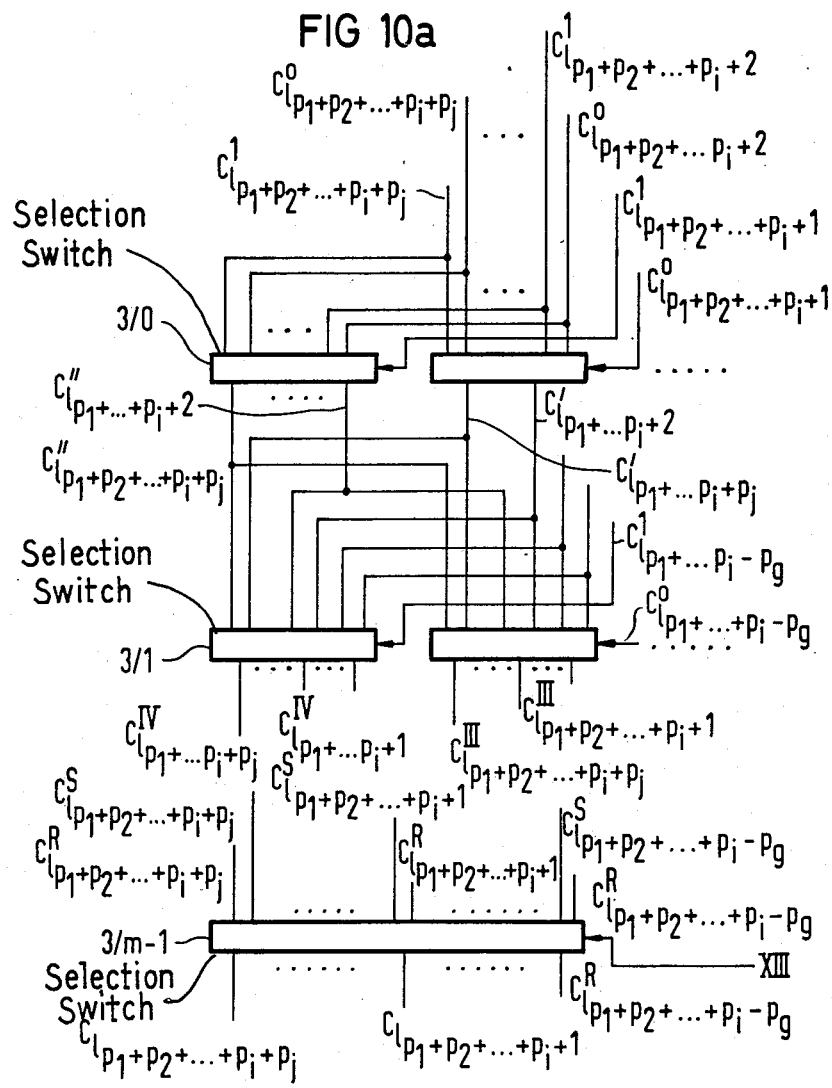
Figure 10B:
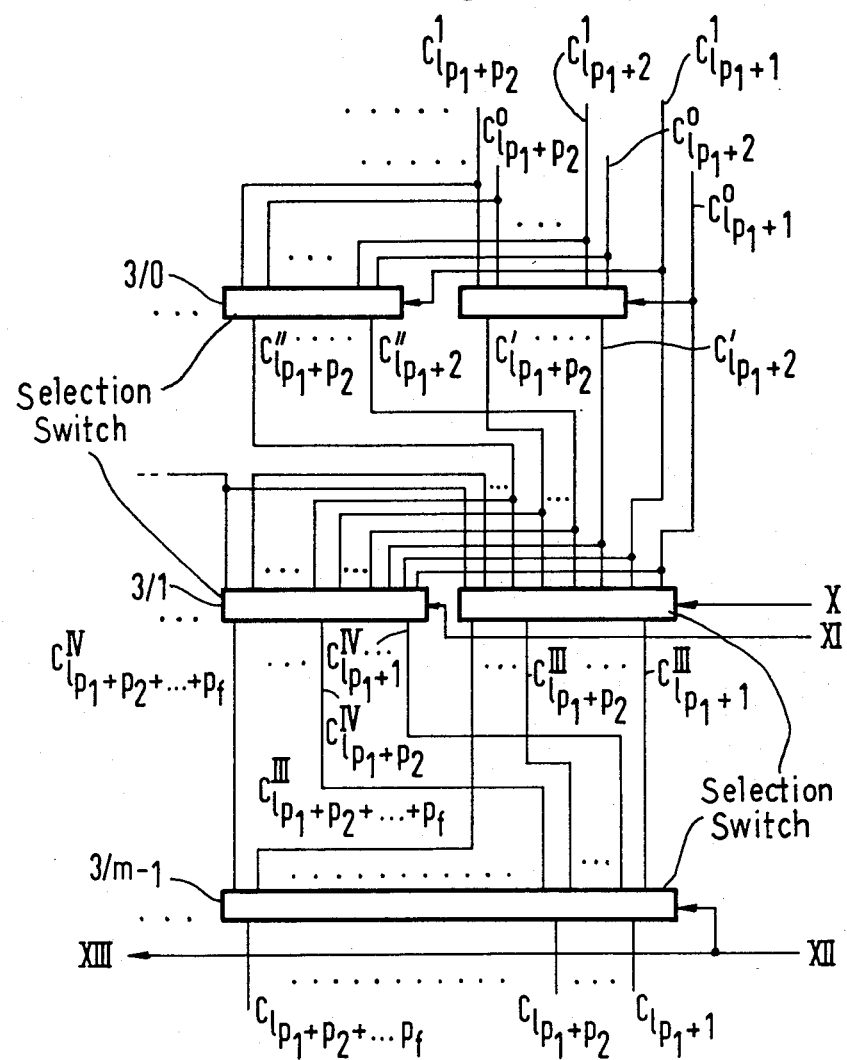

Referring to FIGS. 10a, 10b, 10c, as taken together in accordance with FIG. 10d, there is an illustration of the group-wise connection of the selection switches 3 in a general form. For the purpose of greater clarity, the figure has been reproduced in the three parts 10a, 10b and 10c. It should also be noted that each selection switch 3 can comprise an arrangement of a plurality of further selection switches (not shown). The alternative carries $C_i^0$, $C_i^1$ are applied in pairs in first groups at the inputs of the decision logic unit 2. The identification of the groups is carried out by way of subscripts $1_1-1_{p1}$ for the lowest-order group to $1_{p1+1}\ldots1_{p1+p2+\ldots pi+pj}$ for the highest-order group. The number of time stages extends from 0 through $m-1$. With the exception of the respectively lowest-order pair of each second group $C_{11}^0$, $C_{11}^1$, $C^0{}_{1p1+1}$, $C^1{}_{1p1+1}$, ..., $C^1{}_{1p1+p2+\ldots+pi+1}$, etc., all carry pairs of a group are simultaneously fed to the date inputs of the selection switches 3/0 of the first stage. The lowest-order carry pair of each group are applied at the control inputs of the respective selection switches of the group. In the next stage, the highest-order carry pairs at the outputs of the selection switches of the first stage $C_{1p1}^1$, $C_{1p1}^{11}$, ... $C_{1p1+\ldots pi-pg}^1$ serve for the drive of the selection switches (disposed in pairs) 3/1 of the second stage to whose data inputs the remaining carry pairs of the preceding stage are fed, whereby a grouping differing from that of the preceding stage can be undertaken. For example, the carry pairs $C_{1p1+1}^0$, $C_{1p1+1}^1$, are fed to the data inputs of the selection switches 3/1 in the lowest-order group of the second stage. The alternative carry pairs arising in this stage are, in turn, fed in new groups to the selection switches of further stages until, in the last stage $m-1$, all carry pairs have been fed to the data inputs of the selection switches 3/$m-1$ whose control inputs are charged, for example, with an entering carry $C_0$. The result carries $C_{11},.,C_{1p1+p2+\ldots pi+pj}$ are selected in this last stage from the carry pairs.

Figure 11A:
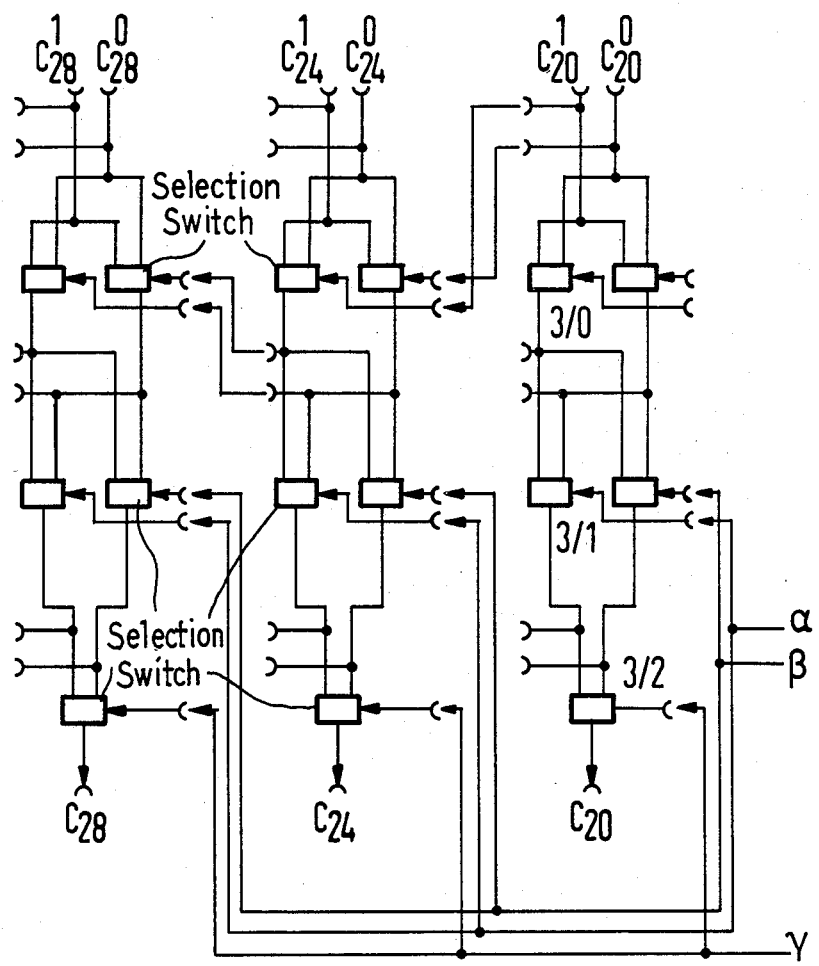
FIG. 11a and FIG. 11b, arranged as illustrated in FIG. 11c, illustrates an example of a decision logic.
Figure 12A:
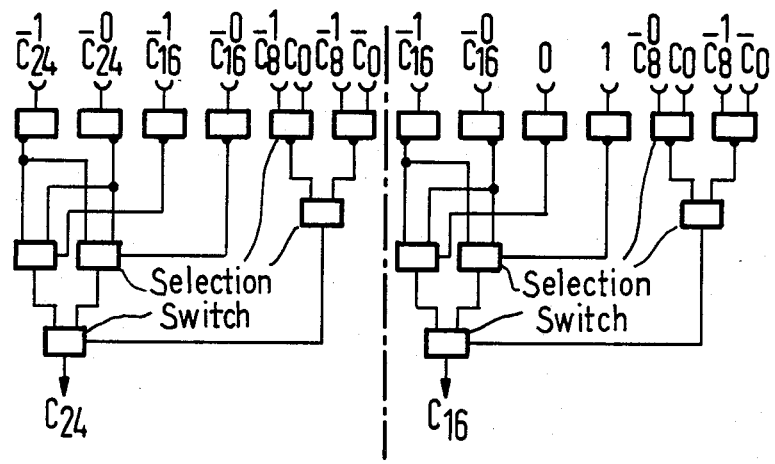
FIGS. 12a and 12b schematically represent decision logic.
Figure 12B:
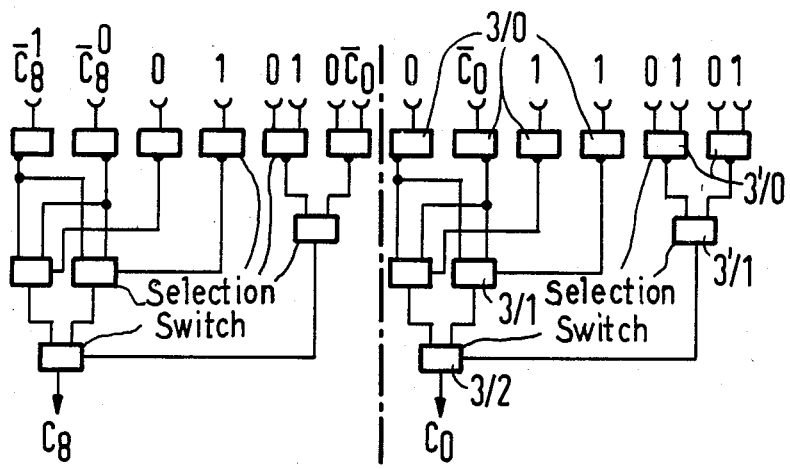

The circuit arrangement illustrated in FIG. 11a and 11b and in FIG. 12a and 12b are constructed of identical "slices". This technology is known as so-called bit slice technology.

Figure 11C:
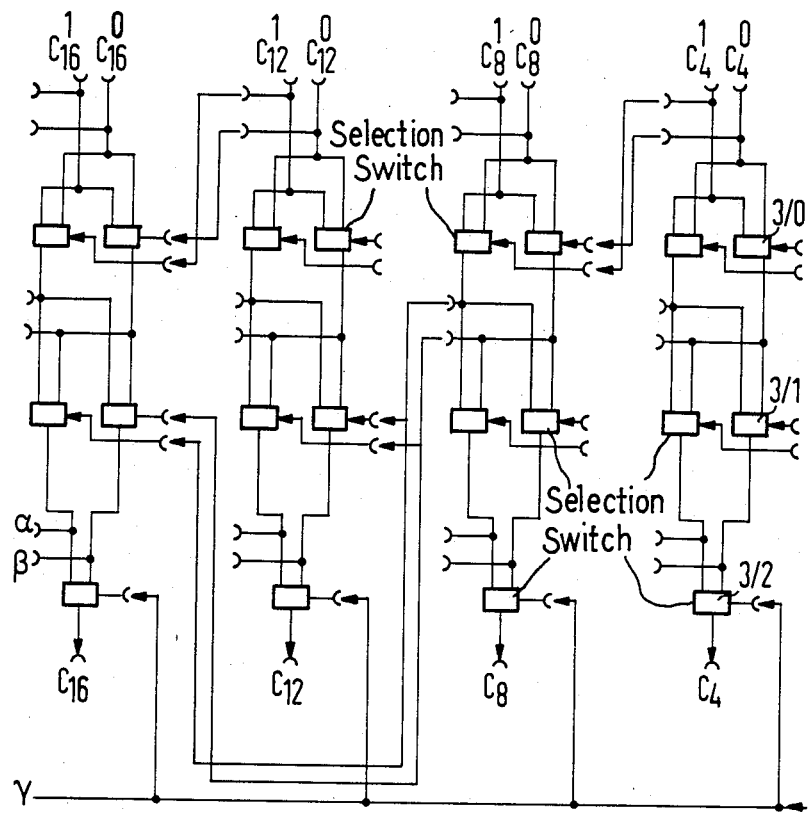

Like the decision logic in FIG. 4, the decision logic of FIG. 11 comprises seven pairs of input lines which are combined into second groups and charged with signal levels which represent the carries $C_4^0$, $C_4^1\ldots C_{28}^0$, $C_{28}^1$. As already described above, these carry pairs arise in that two operands A and B consisting of bit sequences ordered according to significance are combined with one another and that this combinational operation is executed once under the assumption of a positive input carry and once under the assumption of a negative input carry. Two alternative result bit sequences, for example sums, and two alternative carries (carry pairs) therefore arise. The bit sequences of the operands are ordered group-wise, whereby a carry pair is assigned to each group.

The decision logic shall be explained below with reference to the example of a 32-bit processing width of two operands and a 4-bit wide slice.

Each of the seven slices is constructed in the same manner, independently of the significance of the group or, respectively, of the carry pairs. The different dependencies on lower-order carry pairs is taken into consideration in that the selection switches 3 in the individual slices are differently driven by preceding slices.

Seven carry pairs referenced $C_i^1$, $C_i^0$ as supplied to the decision logic in FIG. 11. The super script 1 or, respectively, the super script 0 indicates that the corresponding carry was determined under the assumption of an entering carry 1 or, respectively, an entering carry 0. The subscript i (i=4,8,12,16,20,24,28), with increasing significance, indicates the place within the bit sequences of the operands A and B at which the carry appears. In the illustrated example, the carries arise when four respective bits are combined into a group. The respective result carry $C_i$ is determined from the possible, alternative carry $C_i^1$, $C_i^0$ with the assistance of the decision logic upon consideration of one or more low-order carries.

Selection switches 3 connected following one another in three time stages 0,1,2 are assigned to each of the carry pairs within a slice. The selection switches 3/0 and 3/1, respectively, of the time stages 0 and 1, respectively, are respectively disposed in pairs. The third time stages respectively exhibit a single selection switch 3/2.

The connections of the control inputs to the inputs of the selection switches 3 of one of the preceding groups depends upon whether carries from a lower-order group are required for the selection of carries in the respective group and time stage. When this is not the case, the control of the selection switches is determined by constant control values that are referenced "x". These rigidly-prescribed control values exhibit a logical signal level of "0" or, respectively, "1". Redundant selection switches 3 of a slice are neutralized with the assistance of the invariable control values, i.e. one of the two applied input quantities is through connected (corresponding to a point-to-point connection). This seizure is selected for the selection switches of a time stage when the carries of a lower-order slice required in this time stage for the selection are not available. When the required carries from the preceding time stage and/or lower-order slice are available, then the same are employed for the drive of the selection switches.

In the example shown in FIG. 11, the selection switches 3 are assigned to each of the carry pairs in three time stages 0, 1, 2. The selection switches 3/0 and 3/1, respectively, of the time stage 0 or 1, respectively, are respectively provided in pairs. The third time stages exhibits a single selection switch 3/2. The carry pair $C_i^1$, $C_i^0$ is simultaneously supplied to both selection switches 3/0 of the first time stage 0. Their outputs branch to the inputs of the selection switches 3/1 of the second time stage 1. The selection switch 3/2 of the third time stage selects the result carry $C_i$ from the respective results of the second time stage. This occurs simultaneously for all slices, driven by the input carry $C_0$.

In FIG. 12, in contrast thereto, there is an illustration of the decision logic whose mutually-identical slices are constructed such that each slice can accept all carry pairs to be processed. One or more selection switches 3 of the first time stage 0 are redundant in accordance with the place or, respectively, significance within a group sequence. They are charged with fixed input quantities in order to assure the drive of the selection switches 3 of the following time stages. The selection switches for the two lowest-order carry pairs of each slice, as well as the selection switch 3' following thereupon, are preferably designed as OR gates or, respectively, as so-called wired OR gates. Negated carry pairs are employed in the example. As may be derived by comparing FIGS. 11 and 12, a decision logic according to FIG. 12 (having the eight-bit slice per slice shown by way of example) involves a lower circuit expense than the four-bit slice of FIG. 11. The lower circuit expense leads to a shortened throughput time of all carries.

Figure 13:
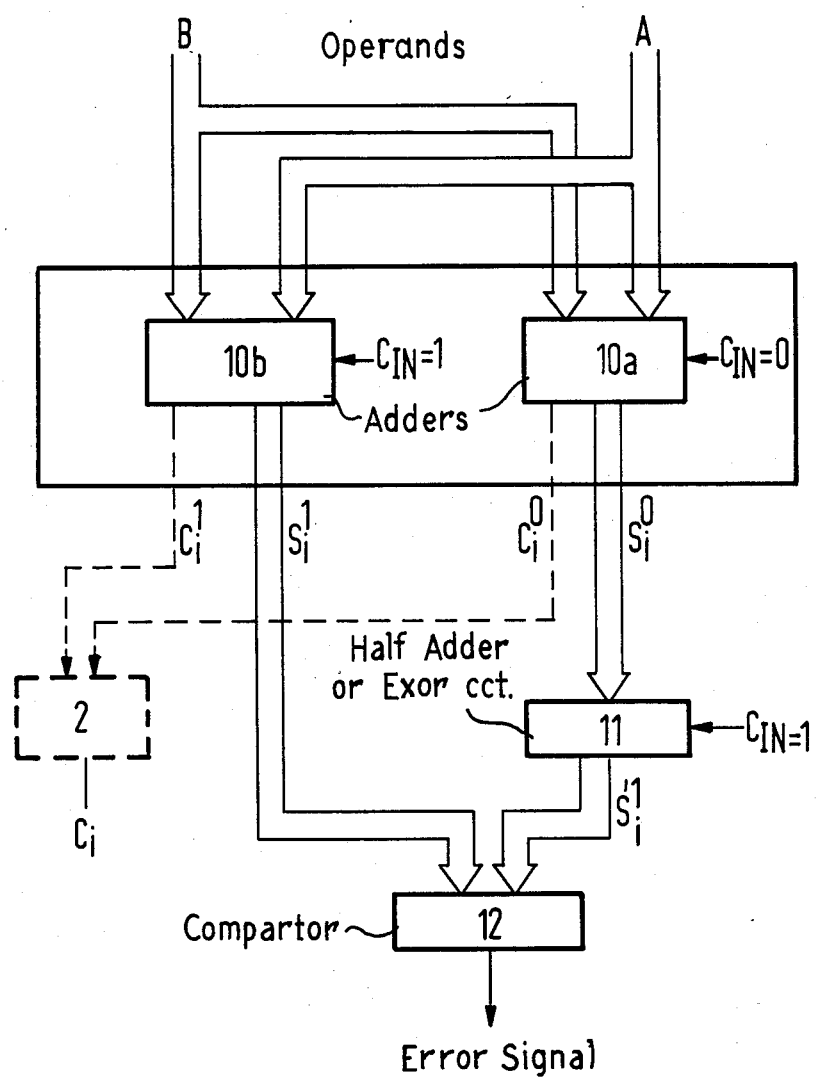
FIG. 13 is a schematic representation of a circuit arrangement for error detection.

FIG. 13 illustrates a circuit arrangement of an error-monitoring device which is based on the presence of the first combinational logic unit for the two bit sequences of the operands A, B and the offering of two alternative sums $S_i^0$ and $S_i^1$.

The first combinational logic unit comprises two full adders or ALUs 10a and 10b which are charged with complementary input carries 0 or, respectively, 1. The sum output $S_i^0$ of the first full adder 10a is supplied to a further adder, for example a half adder, or to an EXCLUSIVE OR (EXOR) circuit 11. This is charged with the input carries $C_{IN}=1$ that is complementary to the input carry of the first full adder 10a. In case the summing in the first full adder 10a and in the second full adder 10b has been executed free of error, a sum $S'_i^1$ may be tapped at the output of the further adder 11 the sum corresponding to the sum generated by the second full adder 10b. The result check occurs bit-wise in a comparator 12 which is constructed, for example, of coincidence elements. A corresponding signal can be tapped at the output of the comparator 12, given coincidence. An error message exists otherwise.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for accelerated carry information in an adder device in response to an input carry for the adder device, in which a plurality of binary-coded operands are available as input signals in first and second groups which are sub-divided into mutually corresponding bit groups, comprising:
   a plurality of parallel operating logic units each including inputs for receiving respective operands of mutually corresponding bit groups;
   each of said logic units comprising means for forming a respective carry pair in response to its input operands, and a pair of outputs for said carry pair independently of the two possible values of the input carry of the bit group;

a decision logic unit including a plurality of inputs connected to said carry pair outputs of said plurality of logic units, a control input for receiving the input carry of the adder device and a plurality of outputs each connected to a respective logic unit;

said decision logic unit comprising a plurality of individual selection switches arranged in time stages and operable to select the output carries, beginning with the carry pairs of a predetermined plurality of the lowest big groups, belonging to such bit groups dependent on the input carry of the adder device and, dependent on the most significant actual output carry respectively identified in the preceding time stage, and increasing number of actual high-order output carries being selected in each following time stage until all carry pairs of said logic units have been served; and said selection switches for the selection of the individual actual output carries being ordered such that for the selection of the individual, actual output carries the selection switches are partly preceded in pairs by selection switches of lower time stages by way of which, respectively dependent on a lower-order carry pair, the respectively appertaining carry is selectable from at least one following higher-order carry pairs so that, in chronological succession, more intermediate carry pairs combining carry pairs are always successively formed simultaneously with the already occurring offering of lower-order output carries.

2. The circuit arrangement of claim 1, wherein:
said two operands each comprise a bit sequence of 28 bits in seven first groups of four bits each;
a first of said time stages comprises a lowest-order second group which comprises a first selection switch whose data inputs are connected to receive the carry outputs of a respective first combinational logic circuit, and three higher-order second groups each comprising two carry pairs and first selection switches whose data inputs are connected to simultaneously receive the higher-order carry pairs of the three higher-order second groups and whose control inputs are connected to receive the lower-order carry pair of the respective group;
a second of said time stages comprises the output of the selection switch of the first group connected to said control inputs of two selection switches whose data inputs are connected to receive the lower-order carry and to the outputs of the selection switches, disposed in pairs, of the second order group of the first time stage;
in said second time stage, the alternative pairs of outputs of the selection switches of the third-order group of said first time stage are alternately connected to pairs of selection switches such that the lower-order carries of the third-order group are simultaneously available at the data inputs of the one pair of selection switches and the outputs of the two selection switches of the first timing stage are simultaneously available at the data inputs of the other pair of selection switches; and
in a third of said timing stages the highest-order carry result output of the second-order group is connected to the control inputs of four selection switches which form a further group at whose data inputs the lower-order carry pair of the third-order group are connected and carries of the first group, in pairs, are available.

3. The circuit arrangement of claim 2, wherein:
said combinational logic circuits each comprise two parallel adders, to which two complementary input carries are supplied.

4. The circuit arrangement of claim 3, wherein:
the output of the two adders providing alternative sum bits are connected with the data inputs of selection switches, whose control inputs are connected with outputs of the decision logic, providing the result carry of the preceding combinational logic unit.

5. The circuit arrangement of claim 4, wherein:
said combinational logic circuit comprises additional to a adder controlled by complementary entering carries a further adder;
said further adder including a control input connected to receive the result carry from the preceding combinational logic unit.

6. The circuit arrangement of claim 1, wherein:
said decision logic unit comprises a multiple of selection switches including more than two input pairs.

7. The circuit arrangement of claim 6, wherein:
a carry pair is connected parallel to the inputs of a selection switch and to the control inputs of a multiple selection switch of a higher group or time stage; and
the input carry of said selection switch is connected and available parallel at the control input of the selection switch and at a further control input of said multiple selection switch.

8. In a parallel combination logic system having a shortened carry run for two binarily-coded operands having bit sequences ordered according to bit significance upon receipt of an input carry, for an adder device, of the type in which a decision logic unit is constructed of selection switches having data inputs and outputs interconnected in group and time stages for determining group-wise assigned conditional carries, the improvement wherein:
first combination logic units are connected to receive said operands in groups and comprise two carry outputs per group for providing one of two possible alternative carries of each group;
a decision logic unit connected to said first combinational logic units to receive said carries, said decision logic unit comprising selection switches arranged group-wise and following one another in time stages, certain ones of said selection switches disposed in pairs and including outputs connected to data inputs of said selection switches of a following time stage; and
control inputs for each of said selection switches for receiving either a carry pair of at least one time stage of at least one lower-order group upon receipt of determined respective carry pairs or prescribed control values when the carry pairs are not available in order to forward input signals of the selection switches to the next time stage.

9. The improved parallel combinational logic system of claim 8, wherein:
the last time stage of a group comprises a single selection switch.

10. The improved parallel combinational logic system of claim 9, wherein:
the control inputs of the selection stages of the last time stages of all groups are connected in common to receive the input carry.

11. The improved parallel combinational logic system of claim 8, wherein:

said first combinational logic units each comprise first and second adders having complementary input carries and sum outputs, a third adder connected to the sum output of said first adder and including an input carry complementary to that of said first adder and a sum output, and a comparator connected to the sum outputs of the second and third adders for comparing the two sums.

12. The improved parallel combinational logic system of claim 11, wherein:

said first and second adders are full adders; and
said third adder is a half adder.

* * * * *